M. D. Wells.
Revolving Rake.

Nº 11538 — Patented Aug. 15, 1854.

UNITED STATES PATENT OFFICE.

MOSES D. WELLS, OF MORGANTOWN, VIRGINIA.

IMPROVEMENT IN HORSE-RAKES.

Specification forming part of Letters Patent No. 11,538, dated August 15, 1854.

*To all whom it may concern:*

Be it known that I, MOSES D. WELLS, of Morgantown, in the county of Monongalia and State of Virginia, have invented a new and useful Improvement in Horse-Rakes; and I do hereby declare that the following is a full, clear, and exact description of the construction and operation of the same, reference being had to the annexed drawings, forming part of this specification, in which—

Figure 4:
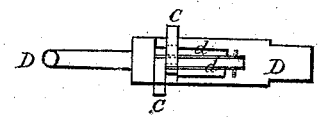
Figure 1:
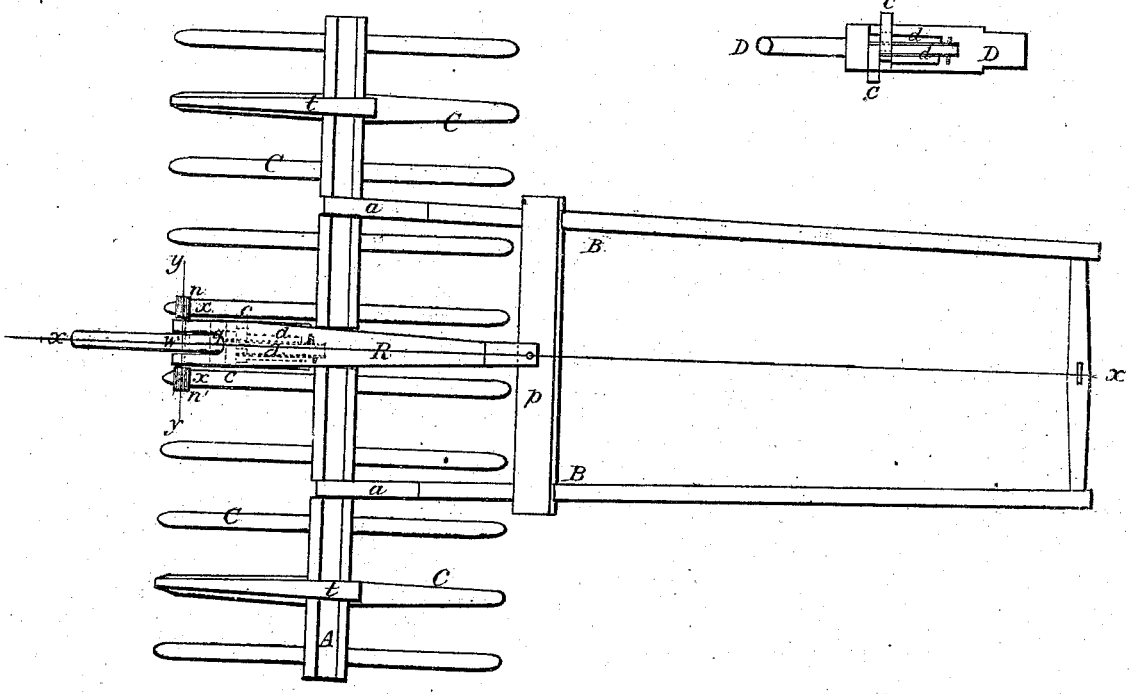
Figure 3:
Figure 2:
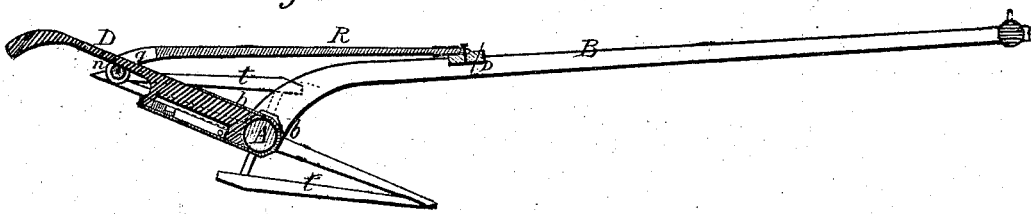

Figure 1 is a plan of the rake. Fig. 2 is a vertical section on line $xx$ of Fig. 1. Fig. 3 is a vertical section on line $yy$ of Fig. 1. Fig. 4 is a plan of governing-lever inverted, showing spring-bolts.

Similar letters in the several figures refer to the same part of the machine.

My invention consists in the employment, in the manner hereinafter to be described, of reverse anti-friction rollers for regulating the action of the rake-teeth.

To enable others skilled in the art to make and use my invention, I will proceed to describe its construction and operation.

In the drawings, A is the rake-shaft, attached to the shaft B by the straps $a$, permitting it to revolve freely.

C represents the teeth, formed and placed in the usual manner.

D is the governing-lever, fastened to the shaft by the strap $b$, and having in its under side the bolts $c$, attached to the springs $d$, as shown in Fig. 4.

Hinged to the cross-bar $p$ of the shafts is the notched plate R, the rear extremity of which is furnished with the rollers $m\ n\ n'$, the former between the jaws of the notch and the last two outside of the plate. The governing-lever passes through the notch $q$ and rests on the roller $m$, while the rollers $n$ and $n'$ rest on the rear teeth of the rake, as shown in Fig. 3.

The operation of my improved rake is as follows: The machine is driven forward and will move on the inclined runners $t$. The governing-lever D, which is held by the operator, rests on the roller $m$, the handle passing through the notch $q$, as seen in Fig. 2. The rollers $n\ n'$ rest on the teeth $xx$, so that any vertical movement of the lever D will cause a movement of the main shaft in its bearings and a corresponding elevation or depression of the front teeth. The rear teeth of the rake are held up by the spring-bolts $c$ of the governing-lever. Consequently a movement of the said lever D causes a revolution of the rollers in reverse directions and a regulation of the elevation of the front teeth. This governing of the elevation of the front teeth could not be effected without the aid of anti-friction rollers, for if an ordinary bar crossed the teeth $x$ $x$ a depression of the governing-lever would raise the shafts whenever the points of the front teeth were raised. This governing of the elevation of the teeth is very essential in operating on undulating or broken ground, as there the successful operation of the machine depends on the teeth-points running the proper distance from the ground. When it is desired to discharge the accumulated hay the governing-lever D is raised, causing the rollers $n\ n'$, by reason of the connection of the plate R with the shafts, to slip back over the points of the rear teeth, between which the lever D works, and permit the rake to revolve forward and discharge the load, the rear teeth being raised by the bolts $c$. The revolution continues until the former front teeth, now rear, press against the bottoms of the bolts $c$, which, yielding to the pressure by reason of the springs $d$, allow the middle teeth to pass up until they strike the rollers $n\ n'$, when the bolts $c$ again shoot out and prevent the rear of the rake from falling. The rollers $n\ n'$ prevent the forward revolution, and the rake is again ready for use.

My improvement in the manner of supporting the rear of the rake by the self-acting bolts $c$ recommends itself for simplicity and effective operation, while the employment of the anti-friction rollers $m\ n\ n'$ places the machine entirely within the control of the operator.

I am aware that various forms of spring-bars are in use for holding the teeth of horse-rakes. I therefore make no claim to spring-bars. Neither do I claim anti-friction rollers of themselves; but What I do claim as my invention, and desire to secure by Letters Patent, is—

The herein-described method of regulating the action of the rake-teeth by the reverse anti-friction rollers $m\ n\ n'$, arranged and operating substantially as herein fully set forth.

In testimony whereof I have hereunto signed my name before two subscribing witnesses.

MOSES D. WELLS.

Witnesses:
  GEO. PATTEN,
  JNO. OBER.